US012799823B2

(12) United States Patent
Batiste

(10) Patent No.: US 12,799,823 B2
(45) Date of Patent: Nov. 17, 2026

(54) BAR-GRATE-DECKING LADDER STABILIZER SYSTEM AND METHOD

(71) Applicant: Caleb Batiste, Lacombe, LA (US)

(72) Inventor: Caleb Batiste, Lacombe, LA (US)

(*) Notice: Subject to any disclaimer, the term of this patent is extended or adjusted under 35 U.S.C. 154(b) by 218 days.

(21) Appl. No.: 18/830,930

(22) Filed: Sep. 11, 2024

(65) Prior Publication Data

US 2026/0071492 A1 Mar. 12, 2026

(51) Int. Cl.
*E06C 7/18* (2006.01)

(52) U.S. Cl.
CPC .................................... *E06C 7/188* (2013.01)

(58) Field of Classification Search
CPC ... E06C 7/46; E06C 7/423; E06C 7/42; E06C 7/00; E06C 5/02
USPC .......................................... 182/108, 109, 39
See application file for complete search history.

(56) References Cited

U.S. PATENT DOCUMENTS

| | | | | |
|---|---|---|---|---|
| 1,651,863 A | 12/1927 | Baur | | |
| 1,862,171 A | 6/1932 | Baker | | |
| 2,177,677 A * | 10/1939 | Staben | E06C 7/46 | 182/201 |
| 3,508,628 A * | 4/1970 | Conrad | E06C 7/423 | 182/172 |
| 4,147,231 A | 4/1979 | Chantler et al. | | |
| 4,153,137 A * | 5/1979 | Johnson | E06C 7/42 | 182/180.1 |
| 4,480,819 A | 11/1984 | Lopez | | |
| 4,836,331 A * | 6/1989 | Foradori | E06C 7/46 | 182/201 |
| 5,222,575 A * | 6/1993 | Santos | E06C 7/484 | 182/108 |
| 5,704,451 A | 1/1998 | King | | |
| 6,547,036 B1 | 4/2003 | Carter | | |
| 6,595,326 B1 * | 7/2003 | Dean | E06C 7/44 | 182/108 |
| 6,655,497 B1 | 12/2003 | Weatherall | | |
| 6,745,869 B2 | 6/2004 | Garrett | | |

(Continued)

FOREIGN PATENT DOCUMENTS

| | | |
|---|---|---|
| GB | 2158499 | 11/1985 |
| KR | 20190123629 | 11/2019 |
| KR | 102582621 | 9/2023 |

*Primary Examiner* — Zoe Tam Tran
(74) *Attorney, Agent, or Firm* — Keaty Law Firm LLC; Thomas S. Keaty

(57) ABSTRACT

A bar-grate-decking ladder stabilizer system and method for removably securing a variety of stepladders to a variety of standard bar-grate decking. A brace unit providing a rack bar with rack teeth, a drop-through preventing handle and an under-grate crossbar is placed through a void between two main bearing bars of bar-grate decking and positioned such that the under-grate crossbar is forced against the underside of the two main bearing bars and the adjacent bars. A clamp unit providing a rack bar guide and a pawl is clamped to a rail or stringer of the stepladder, with the rack bar of the brace unit passing upward through the rack bar guide of the clamp unit. In a ratcheting action the pawl allows upward movement of the rack bar but prevents downward return by locking into the rack teeth of the rack bar, thereby maintaining a pulling force between the ladder rail and the decking, stabilizing the stepladder for safe use.

12 Claims, 8 Drawing Sheets

(56) References Cited

U.S. PATENT DOCUMENTS

| | | | | |
|---|---|---|---|---|
| 8,042,651 | B1 * | 10/2011 | Michnik | E06C 7/426<br>182/108 |
| 2007/0193827 | A1 * | 8/2007 | Lambert | E06C 7/46<br>182/108 |
| 2010/0252645 | A1 | 10/2010 | Maurer et al. | |
| 2011/0132684 | A1 * | 6/2011 | Wilkins | E06C 7/46<br>182/107 |
| 2012/0199416 | A1 | 8/2012 | Hopkins et al. | |
| 2014/0001333 | A1 * | 1/2014 | Stephen | E06C 7/46<br>248/530 |
| 2014/0231171 | A1 * | 8/2014 | Kerr | E06C 7/46<br>182/108 |
| 2016/0369563 | A1 | 12/2016 | Adcock et al. | |
| 2021/0198947 | A1 * | 7/2021 | Goudreault | E06C 7/423 |
| 2023/0021230 | A1 | 1/2023 | Santana et al. | |

* cited by examiner

BAR-GRATE-DECKING LADDER STABILIZER SYSTEM AND METHOD

BACKGROUND OF THE INVENTION

This invention provides a bar-grate-decking ladder stabilizer system and method for removably securing a variety of stepladders to a variety of standard bar-grate decking.

Bar grating, specifically anti-slip grating or slip-resistant grating, is used as decking on structures and rigs in industrial, mining, energy production, maritime, and similar demanding uses. Metal-bar grating, almost always serrated, of steel or sometimes aluminum is widely used as decking. Fiberglass reinforced plastic grating (FRP grating or fiberglass grating) is a composite material combining resin and fiberglass also widely used as decking. This bar-grate decking is structural and weight-bearing between spans.

Ladders, particularly stepladders or front-step ladders having an A-frame self-supporting structure which can be collapsed, stored, transported, and set up as needed, are used for many inspection, maintenance, emergency repair, and occasional access tasks which do not warrant the installation of a fixed ladder or an elevated section of decking. Such stepladders are usually purchased as standard stepladders generally available, without any special features or safety provisions for heavy industrial or production work on bar-grate decking. Often the stepladder will need to be set up in a busy area or active section of decking, presenting a risk of the ladder being jostled and persons on the ladder being injured. Somewhat paradoxically the arrangement of alternating bars and voids and the serrations which improve traction for persons walking on the bar-grate decking do not significantly improve the stability of ladders, because each of the four feet of the ladder only provide a few square inches each of footprint surface, and a significant portion of each footprint will be placed over a void between bars or a void between serrations and will not be in actual contact with the decking.

It is sometimes necessary to place a stepladder very close to or up against some object or structure, especially when, for instance, climbing up on top of a structure or building. Any stabilization device or structure which is bulky or cumbersome or extends past the footprint of the ladder might not allow for proper safe use with a ladder placed close to or against something. A fixed ladder can usually be permanently mounted in places and circumstances where frequent access is needed. Therefore, when a general-purpose stepladder is used, it is likely to be used on an area of decking normally used for movement back and forth or for other purposes. Also, the circumstances leading to the use of the stepladder might involve some urgency and increased activity. Stabilization of the stepladder is usually required, for good reason. But if a stabilization device is too bulky or cumbersome to be carried quickly, by hand, along with the stepladder itself, in one trip, then the risk that no stabilization will be used, in an urgent situation, will be greatly increased. Even where a stabilization device is at hand, if the installation of the device is complex or time-consuming, in urgent conditions the stabilization might be skipped or might be installed badly.

What is needed is a bar-grate-decking ladder stabilizer which can secure a variety of stepladders on a variety of standard bar-grate decking, which can be set up and taken down quickly, easily, and correctly, and can be stored and handled along with the ladder, ensuring availability when needed.

UK Publication No. 2 158 499 for a "Ladder Support Device," published on Nov. 13, 1985 by inventors Warren Anthony Talbot et al., discloses locating devices for preventing slippage of a ladder on a grating, grille, or like surface comprising a member for receiving the end of an upright of a ladder, and a member for engaging the surface. The end of the upright of the ladder is located in the receiving member by means of a screw arrangement. The member engages the grating by means of projections. The member can be connected to the member by means of a ball and socket arrangement. By utilizing a pair of devices, a ladder may be located at any desired inclination whereby the member will contact the member in the desired position.

Korean Patent No. 10-2582621 for an "Overturn Preventing Device for Ladder," issued on Sep. 20, 2023, provides for a ladder fall prevention device to prevent a ladder used in ship construction from falling. It is equipped with a fall prevention means to prevent a foldable ladder from falling, and the fall prevention means is installed in the middle of the first to fourth frames, respectively. A U-shaped connector, a first fall prevention connecting means whose both terminals are connected to the U-shaped connectors installed on the first frame and the third frame, and a second terminal whose both terminals are connected to the U-shaped connectors installed on the second frame and the fourth frame. A fall-prevention connecting means, a fall-prevention bar in which the first and second ring portions formed on the upper sides of both ends are respectively fastened to the middle of the first fall-prevention connecting means and the second fall-prevention connecting means, and a second ring formed on the lower side of both ends of the fall-prevention bar. An automatic bar belt passing through the third ring and the fourth ring, installed on one side of the automatic bar belt, an automatic bar handle that adjusts the length and tension, and formed at both ends of the automatic bar belt, respectively, and a folding ladder on the floor. By providing a configuration that includes an automatic bar ring with a fastening ring, it is possible to prevent the ladder from falling and work without restrictions due to location and space.

U.S. Pat. No. 6,745,869 for "ROOFMATES™ Roofing Accessories," issued on Jun. 8, 2024 to assignee Roofmates, Incorporated, provides for a number of roofing accessories, including a lightweight adjustable ladder and scaffold support. The scaffold support is provided with a pair of rails spaced the standard spacing of most roof joists. Connected to the rails through suitable holes and slots, are rods supporting an adjustable platform. One of the rods may be placed through a corresponding slot to achieve a suitable angle of adjustment corresponding to roof incline. An apparatus is also provided for supporting loads of materials or supplies on an inclined roof, using components and parts in common with the scaffold support, or components and parts similar thereto. A tool tray is provided which may be backed with a layer of foam to prevent the tray from slipping off the roof, while allowing the tray to be freely moved along and up and down the roof, as work progresses.

U.S. Pat. No. 1,862,171 for a "Ladder Shoe," issued on Jun. 7, 1932 to inventor Walter James Baker, provides for "ladder shoes" or adjustable extensions for ladders to enable workmen or others to conveniently set up a ladder upon a sloping ground or other surface.

US Publication No. 2012/0199416 for a "Ladder Stabilizer," published on Aug. 9, 2012 by inventors Raymond Hopkins et al., discloses a ladder stabilizer having a base plate that engages with a lower portion of the ladder and having a tire receiving portion at an end portion of the base plate. The weight of a vehicle tire on the tire receiving portion provides increased stability to the base plate of the ladder stabilizer. The tire receiving portion can be moved to either side of the base plate and can have a base plate-engaging mechanism on its bottom surface to couple with a mating surface of the base plate. The ladder can be retained by a leg retainer, rung retainer, or other retaining member that is coupled to a ladder retainer attachment portion of the base plate. Preferably, the ladder retainer mechanism includes some type of fastener or tensioning mechanism to secure the lower portion of the ladder to the base plate.

U.S. Pat. No. 6,655,497 for a "Stabilizer for Ladders," issued on Dec. 2, 2003 to inventor Barrie Weatherall, provides for a stabilizer for ladders, where the stabilizer comprises a rigid, generally flat base having a linear channel extending along a first, upper surface thereof, which channel is defined by a pair of generally parallel, upwardly-extending side members having upper edges directed towards each other, and at least one ladder attachment by means of which a ladder stile may be extended downwardly.

U.S. Pat. No. 5,704,451 for a "Ladder Stabilizing System," issued on Jan. 6, 1998 to inventor Steven L. King, provides for a ladder stabilizing system including a pair of mounting assemblies coupled to a lower end of a ladder. Further provided are a pair of stabilizing mechanisms slidably engaged with respect to the mounting assemblies. A pair of feet are pivotally coupled to an associated stabilizing mechanism at a lower end thereof. The feet are adapted to pivot within a plane common to a plane defined by the vertical members of the ladder. Also included is a ladder shoe accessory comprising an elongated member having a rectangular configuration with a lower face and an upper face with a pair of elongated side faces integrally coupled between side edges of the lower face and upper face thereby defining an elongated slot. The upper face further has an elongated slit formed therein and extended between a pair of open ends of the ladder shoe accessory. The feet are adapted to be situated within the elongated slot of the first shoe accessory. Further provided is at least one stabilizer control mechanism for allowing a user to dictate the extent to which the stabilizing mechanisms extend below the ladder.

U.S. Pat. No. 4,480,819 for an "Attachable/Detachable Railing Device," issued on Nov. 6, 1984 to inventor Keith Lopez, provides for a protective railing device having posts for supporting a barrier means and with the posts having foot portions that are attachable to the grating of an offshore platform.

U.S. Pat. No. 1,651,863 for a "Ladder Jack," issued on Dec. 6, 1927 to inventor Mathieu J. Baur, provides for a removable, adjustable ladder jack to support a ladder on a flat or an inclined base.

U.S. Pat. No. 6,547,036 for a "Ladder Leg Support Apparatus," issued on Apr. 15, 2003 to inventor Boyce N. Carter, provides for a ladder leg support apparatus that includes a support member having upstanding inner side and back walls and inclined outer side and back walls. Flanges selectively positioned along the inner side walls support a plate at a selected height for supporting a ladder leg thereon. An auxiliary side panel is pivotally coupled to an outer side wall and may be extended and supported with a support leg to provide stability when the support member is positioned on a stair. The apparatus further includes a platform having a support surface on which the support member may be positioned. The platform includes threaded leg assemblies which may be extended to a downwardly adjacent stair to support the platform on a selected stair. The platform includes at least one sight level for verifying the proper support leg length adjustment.

SUMMARY OF THE INVENTION

This invention provides a bar-grate-decking ladder stabilizer system and method for removably securing a variety of stepladders to a variety of standard bar-grate decking.

A brace unit providing a rack bar with rack teeth, a drop-through preventing handle and an under-grate crossbar is placed through a void between two main bearing bars of bar-grate decking and positioned such that the under-grate crossbar is forced against the underside of the two main bearing bars and the adjacent bars. A clamp unit providing a rack bar guide and a pawl is clamped to a rail or stringer of the stepladder, with the rack bar of the brace unit passing upward through the rack bar guide of the clamp unit. In a ratcheting action the pawl allows upward movement of the rack bar but prevents downward return by locking into the rack teeth of the rack bar, thereby maintaining a pulling force between the ladder rail and the decking, stabilizing the stepladder for safe use.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
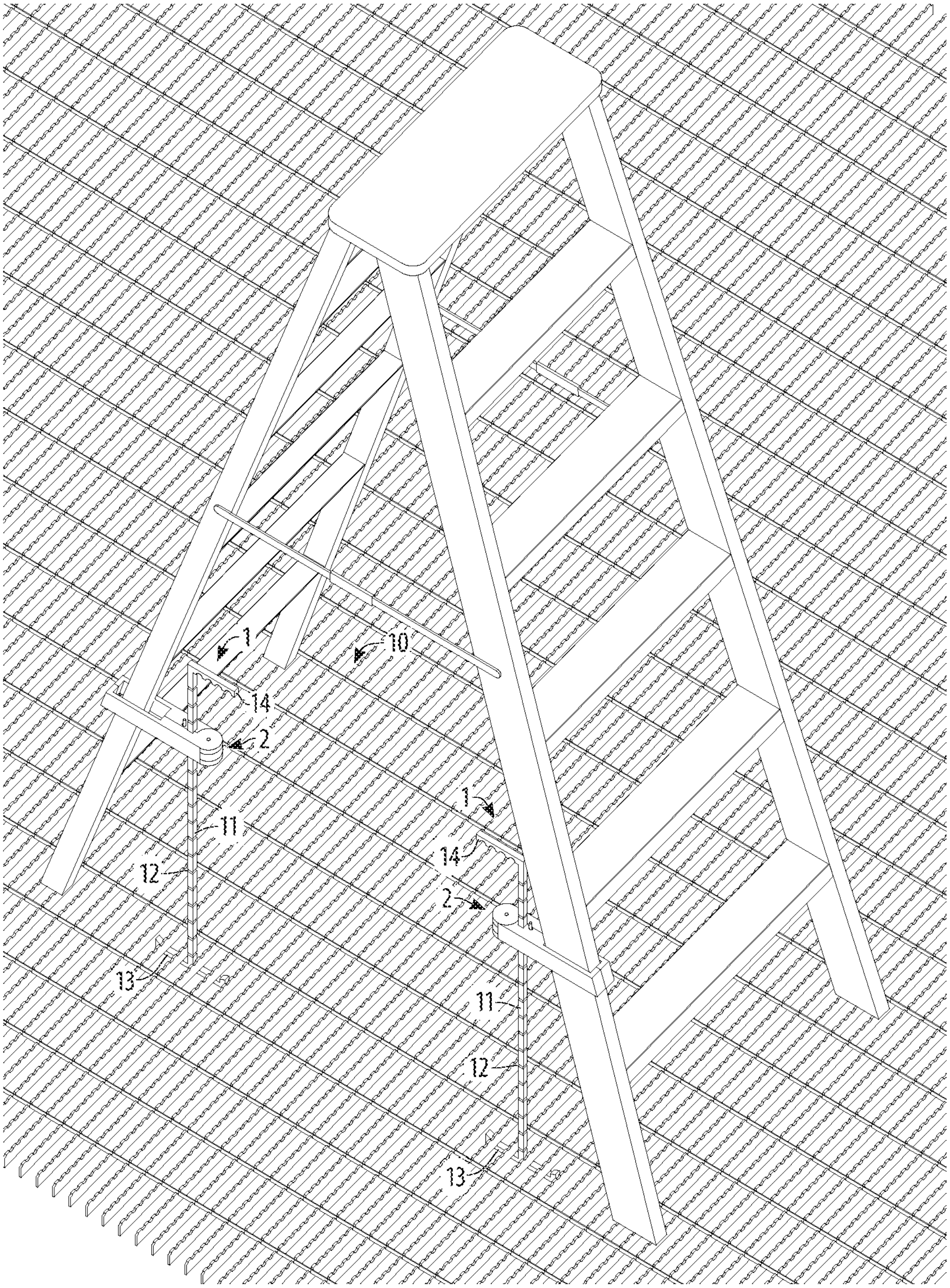
FIG. 1 is a perspective view of the bar-grate-decking ladder stabilizer of the invention in use on metal bar-grate decking.

Referring to FIG. 1, the bar-grate-decking ladder stabilizer 10 system and method easily and removably secures a standard stepladder to standard bar-grate decking such as the serrated metal bar decking illustrated. A brace unit 1 providing a rack bar 11 having rack teeth 12 is placed through a void between the bars of the decking so that an under-grate crossbar 13 contacts and pulls against the undersides of the bars and other adjacent bars. A drop-through preventing handle 14 is used to pull upward lightly during installation, and also catches on the bars and prevents a drop through if accidentally dropped. The drop-through preventing handle 14 is made parallel with the under-grate crossbar 13 in order to provide a visual indication of the orientation of the under-grate crossbar 13 installed under the decking.

A clamp unit 2, treated in detail below, clamps onto a rail or stringer of the stepladder, with the rack bar 11 of the brace unit 1 passing through the clamp unit 2, where the rack teeth 12 can be caught by an internal pawl, exerting a ratcheting action pulling upward on the under-grate crossbar 13 of the brace unit and pulling downward on the rail of the ladder. Rack teeth 12 are provided on at least two faces of the rack bar 11, on at least one face parallel to the under-grate crossbar 13 and at least one face perpendicular. Therefore, the brace unit can be installed such that the under-grate crossbar 13 is always perpendicular to the main bars of the decking. The illustrated preferred embodiment shows rack teeth 12 provided on all four faces of the rack bar 11.

For greater stability and for a fail-safe backup two or more units of the bar-grate-decking ladder stabilizer 10 can be installed, as shown. The light weight, small cost, easy transport, and easy set-up and take-down of the system allows for using more than one unit.

The brace unit 1 can be made from metal bar or rod. The drop-through preventing handle 14 can be formed by bending or by welding or otherwise securely attaching the handle to the rack bar 11. The under-grate crossbar 13 should normally be very securely welded to reduce risk of other methods or fasteners coming loose or failing in use.

Figure 2:
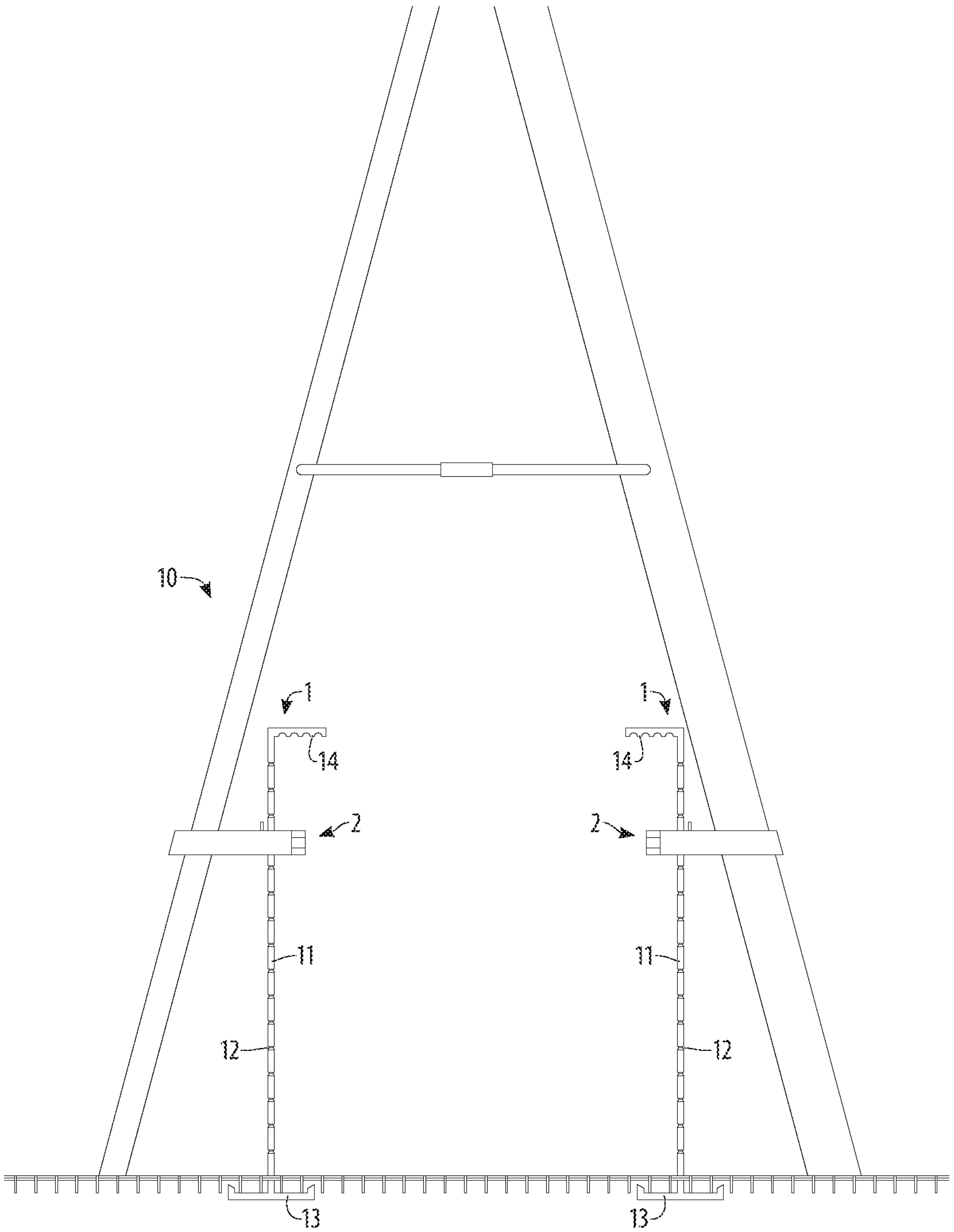
FIG. 2 is a side view of the bar-grate-decking ladder stabilizer of the invention in use on metal bar-grate decking.

Referring to FIG. 2, the bar-grate-decking ladder stabilizer 10 is used with standard types of bar-grate decking and with standard general-purpose stepladders of the A-frame type. The rails, stringers, or sides of the ladder will always incline inward toward the top, and therefore both downward and inward force applied to the rails through the clamp units 2 will always have a downward component pulling the ladder securely toward the deck. In use, the under-grate crossbar 13 is pulled up against the undersides of at least the two bars defining the void or slot which the brace unit 1 has been placed through, plus the adjacent bars on either side, for a total of four bars. If the under-grate crossbar 13 were to be made longer to span more bars, then it might become too long to be placed into the available voids or slots found in standard bar-grate decking. In the illustrated preferred embodiment, the under-grate crossbar 13 has a length of approximately 5 inches. The length of the rack bar 11 is very approximately 30 inches, which allows for installation of the clamp units 2 on the rails of the ladder between the lowest step at approximately 1 foot and the next lowest step at approximately 2 feet, with a large amount of adjustment allowed.

Figure 3:
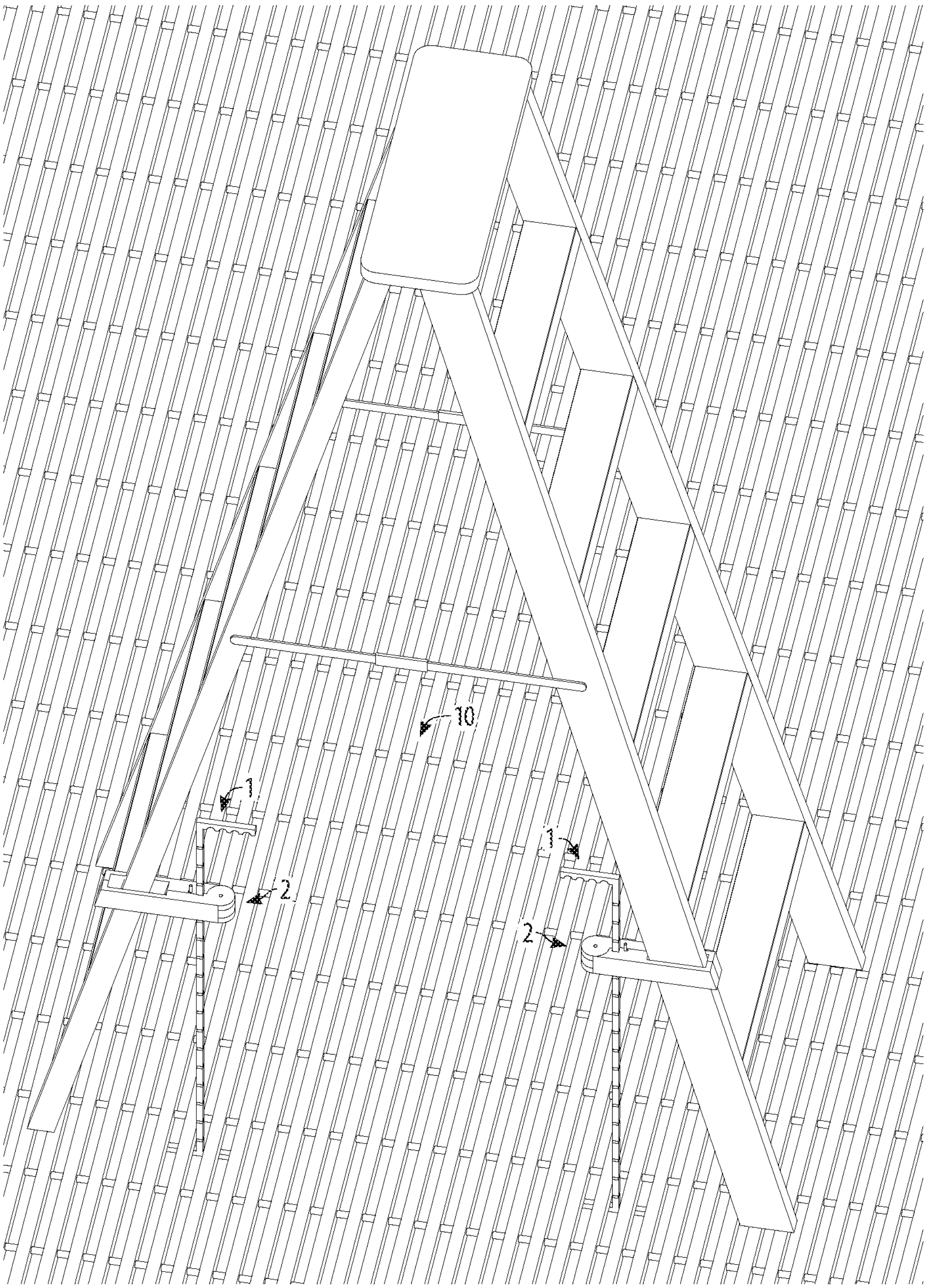
FIG. 3 is a perspective view of the bar-grate-decking ladder stabilizer of the invention in use on fiberglass bar-grate decking.

Referring to FIG. 3, the bar-grate-decking ladder stabilizer 10 is also used on standard fiberglass or FRP grate decking, which has thicker bars and narrower voids or slots between compared to standard metal bar grate decking. The illustrated preferred embodiment can be used interchangeably between metal bar decking and fiberglass bar decking.

Figure 4:
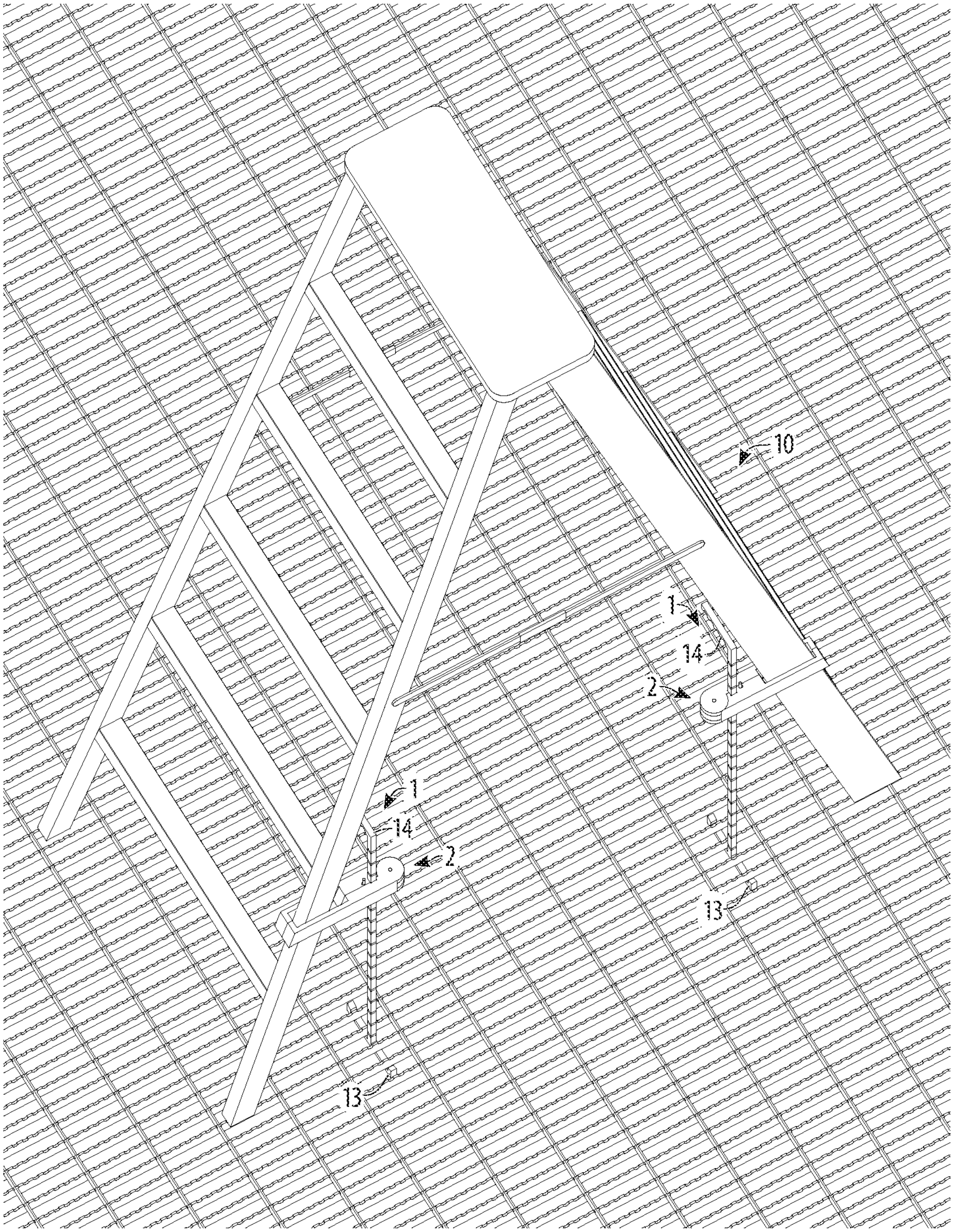
FIG. 4 is a perspective view of the bar-grate-decking ladder stabilizer of the invention in use on metal bar-grate decking with the ladder placed perpendicular to the long bars of the grate.

Referring to FIG. 4, while the illustrations have shown ladders installed with the steps running parallel to the main bars of the decking, the ladder can also be installed with the steps running perpendicular to the main bars, as shown here. Because the brace unit 1 provides rack teeth 12 on at least two faces of the rack bar 11, the under-grate crossbar 13 can be installed at the proper perpendicular to the main bars of the decking, and the drop-through preventing handle 14 can be turned either inward or outward as best suits the specific installation.

Figure 5:
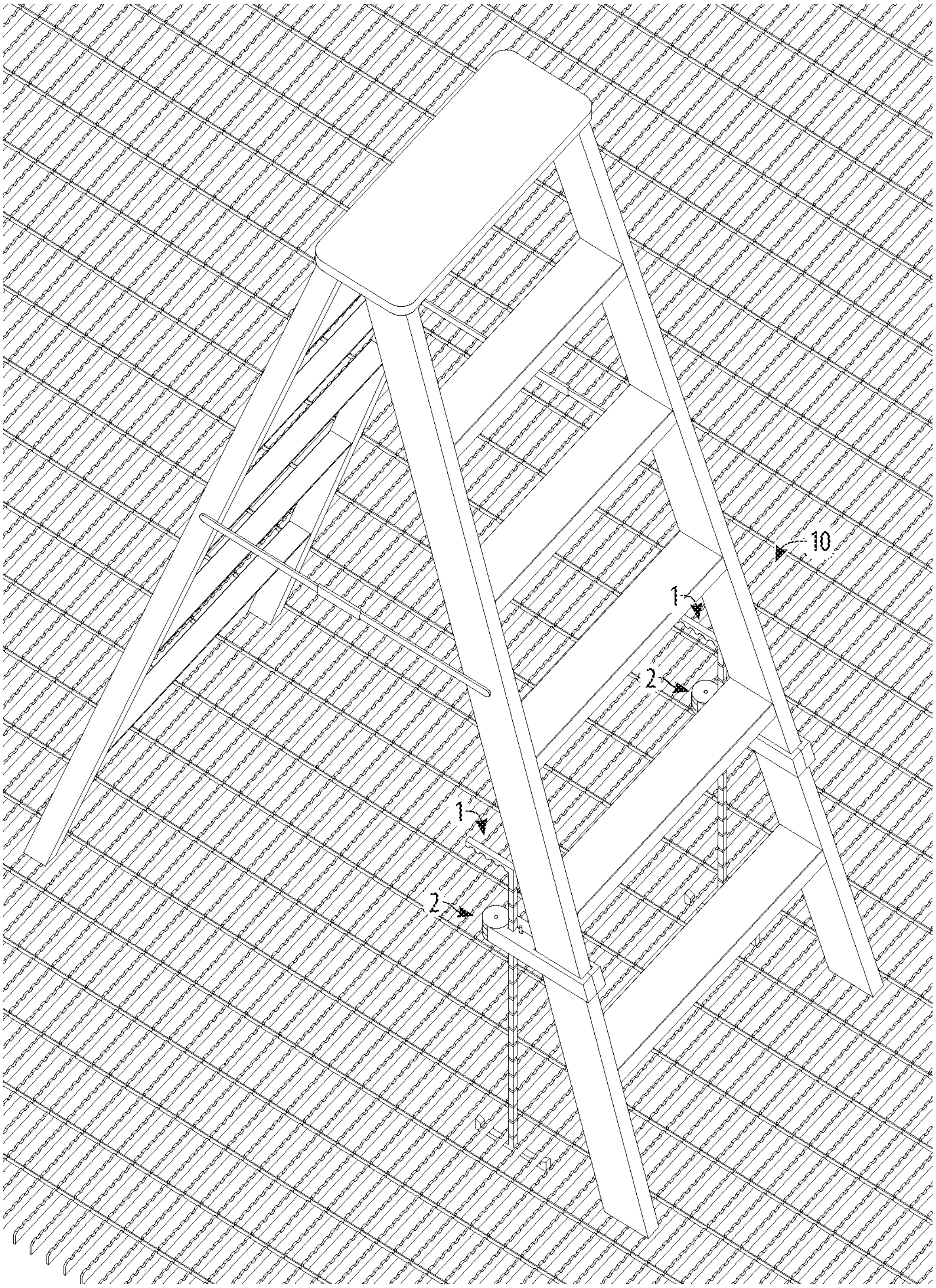
FIG. 5 is a perpendicular view of the bar-grate-decking ladder stabilizer of the invention in use in an alternate configuration on metal bar-grate decking.

Referring to FIG. 5, it is advisable and preferred that two units of the bar-grate-decking ladder stabilizer 10 be used for added stability and fail-safe protection. The clamp units 2 can be attached interchangeably to the step rails and the usually smaller back rails of various different stepladders providing varying sizes of rails. Both units of the bar-grate-decking ladder stabilizer 10 can be clamped to both step rails, as shown, which might be needed in circumstances where the back of the ladder, or the decking under the back of the ladder, is blocked.

Figure 6:
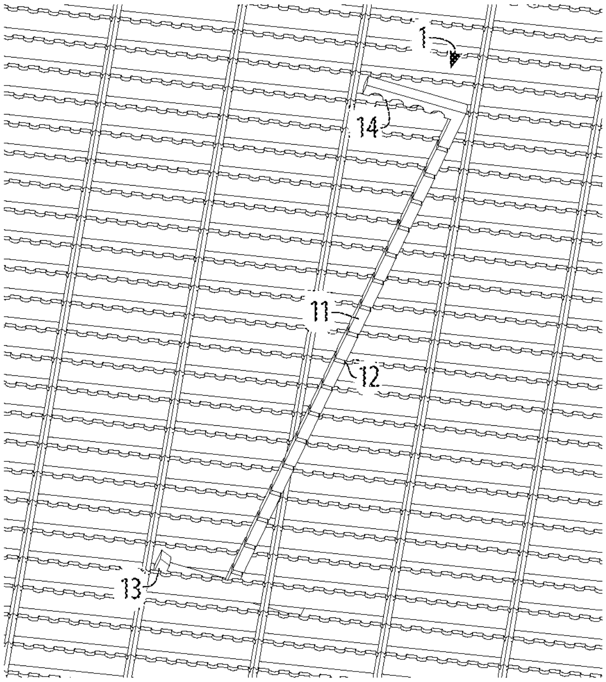
FIG. 6 is a perpendicular view of the initial placement of the brace unit of the bar-grate-decking ladder stabilizer of the invention in use on metal bar-grate decking.
Figure 7:
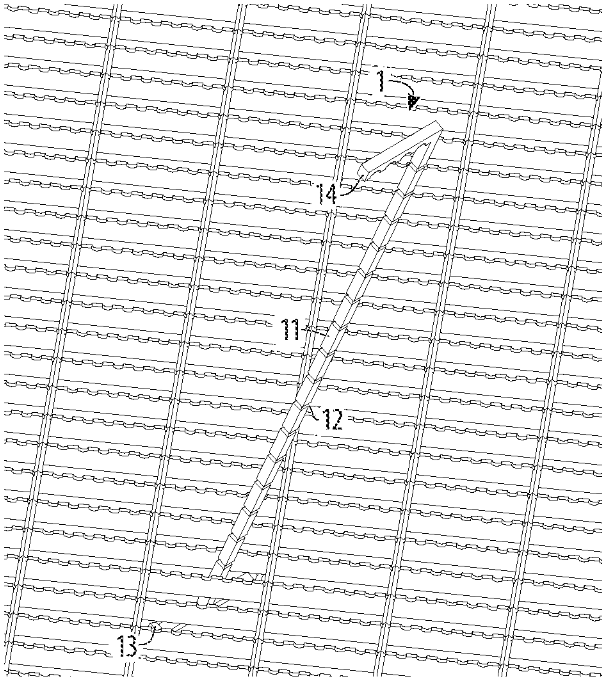
FIG. 7 is a perpendicular view of the subsequent placement of the brace unit of the bar-grate-decking ladder stabilizer of the invention in use on metal bar-grate decking.

Referring to FIG. 6 and FIG. 7, the placement of the brace unit 1 through standard serrated steel bar grate decking, having the standard crossbar spacing of 4 inches, is shown. One end of the under-grate crossbar 13 is placed first, at an angle, into the void or space between two main or bearing bars. Then the other end is placed through the bars and the unit is turned, using the drop-through preventing handle 14, so that the under-grate crossbar 13 runs perpendicular to the main or bearing bars.

Figure 8:
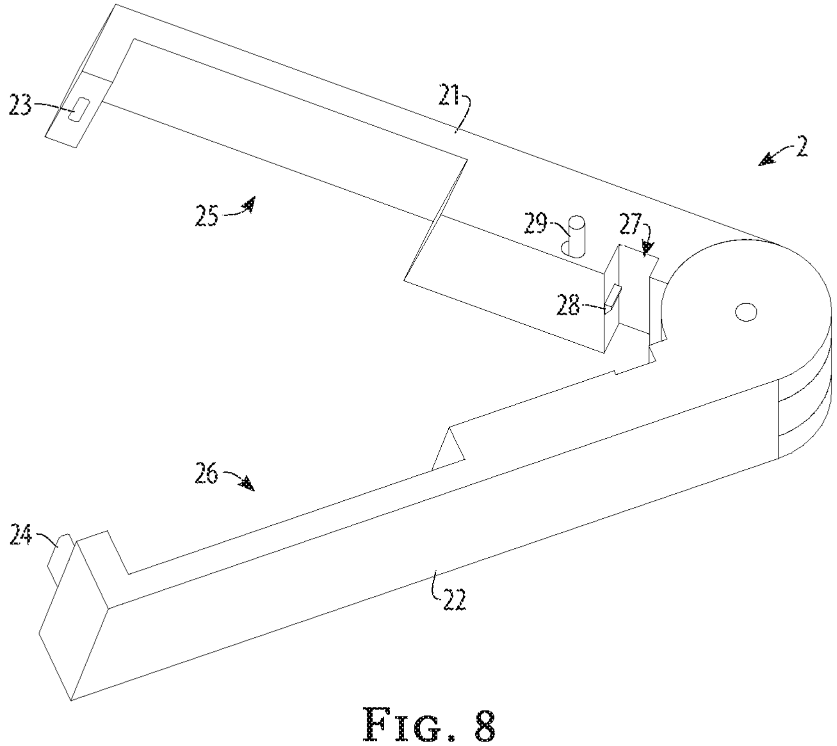
FIG. 8 is a perpendicular view of the clamp unit of the bar-grate-decking ladder stabilizer of the invention, open, with the pawl extended.
Figure 9:
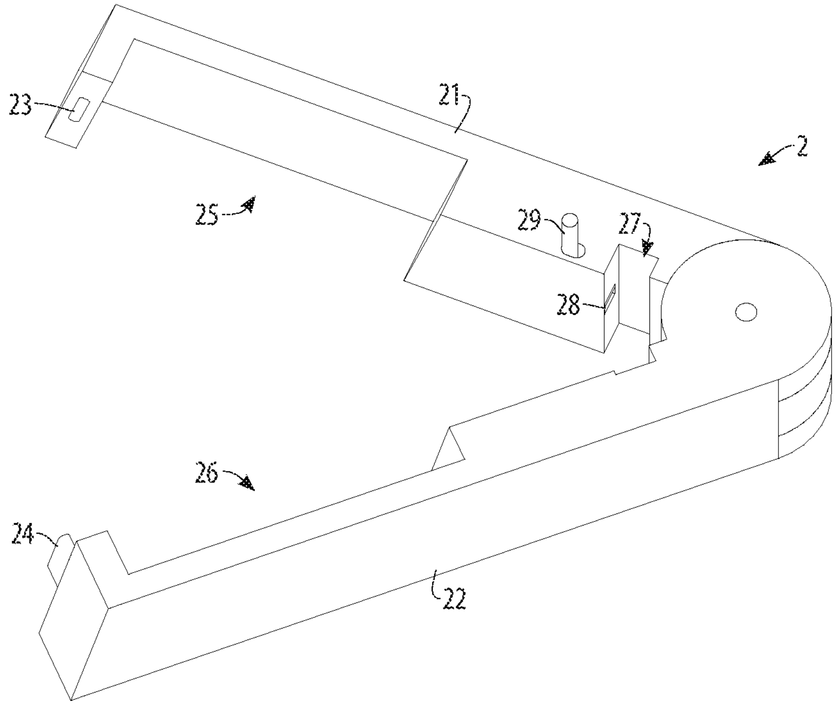
FIG. 9 is a perpendicular view of the clamp unit of the bar-grate-decking ladder stabilizer of the invention, open with the pawl retracted.

Referring to FIG. 8 and FIG. 9, the clamp unit 2 can be opened to allow placement around a rail of the stepladder, and then closed to clamp to the ladder rail. In the illustrated embodiment the clamp is provided with two arms, a pawl-side arm 21 and a free-side arm 22 connected through a pivoting connector. When closed, the arms are held together and the clamping force is maintained by a latch socket 23 and corresponding latch plug 24. A variety of sizes of ladder rails are accommodated within the ladder-rail larger clamp 25 and ladder-rail lesser clamp 26 when the unit is closed. In use, the rack bar 11 of the brace unit 1 is placed through the rack bar guide 27 of the clamp unit 2. A pawl 28, operated by a pawl release 29 extends into and retracts from the rack bar guide 27 space. An internal spring keeps the pawl 28 extended unless the pawl release 29 is used to retract it. In use, the pawl 28 extends into the rack teeth 12 on the rack bar 11 of the brace unit 1. The shape and angles of the pawl 28 and the opposite matching configuration of the rack teeth 12 create a ratchet or ratcheting action where the brace unit 1 can easily be pulled upward through the installed clamp unit 2, with the upward moving rack teeth 12 pushing the pawl 28 back to allow travel of the rack bar 11, and the return of the pawl 28 into the next rack tooth 12, locking the rack bar 11 against backward movement, and maintaining whatever force was used to pull the brace unit 1 upward against the under-grate crossbar 13 in contact with the underside of the main bearing bars of the decking. Therefore, the installed bar-grate-decking ladder stabilizer 10 places and maintains a pulling force between the ladder rail and the decking, stabilizing the ladder for safe use. After use, the pulling force can be released by the pawl release 29 of the clamp unit 2, which can be removed from the ladder rail and the rack bar 11. The brace unit 1 can be turned, angled, and pulled back up through the void or slot between the bars. The interchangeable brace units 1 and clamp units 2 can be transported and stored either along with the ladder itself, or otherwise such that they are readily accessible the next time when needed.

Figure 10:
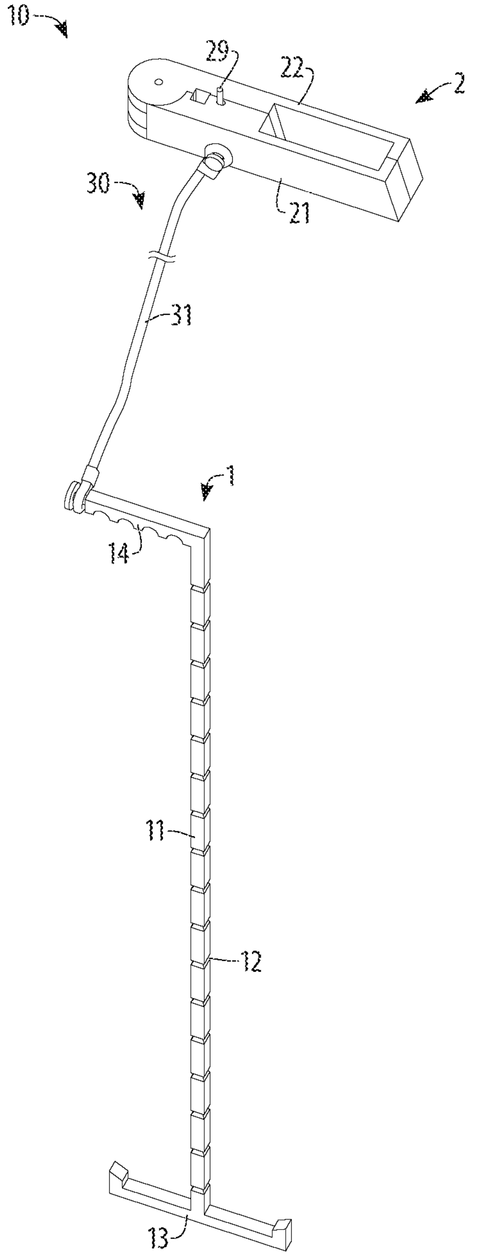
FIG. 10 is a perpendicular view of the bar-grate-decking ladder stabilizer of the invention in use with an optional safety cable.

Referring to FIG. 10, optionally a safety cable 30 is provided which can both provide extra security against the brace unit dropping through the bar-grate decking and possibly injuring someone or something below, and can serve to keep the brace unit 1 and clamp unit 2 together during storage, transportation, and use. In the illustrated embodiment the safety cable 30 is implemented as a steel cable 31.

Many other changes and modifications can be made in the system and method of the present invention without departing from the spirit thereof. I therefore pray that my rights to the present invention be limited only by the scope of the appended claims.

I claim:

1. A bar-grate-decking ladder stabilizer system for use with a standard stepladder on bar-grate decking, the bar-grate-decking ladder stabilizer system comprising:
- (i) a brace unit comprising:
  - (a) a rack bar having rack teeth and having an upward and downward orientation in use;
  - (b) an under-grate crossbar at the downward end of said rack bar, adapted to placement through a void in the bar-grate decking and contact against the underside of the bar-grate decking; and
  - (c) a drop-through preventing handle at the upward end of said rack bar; and
- (ii) a clamp unit comprising:
  - (a) a ladder-rail clamp adapted to clamp to the ladder rail of a standard stepladder;
  - (b) a rack bar guide adapted to allow and control movement of said rack bar; and
  - (c) a pawl adapted to move into and out of said rack bar guide in a ratcheting action allowing upward movement of said brace unit in contact with the bar-grate decking against said clamp unit in contact with the ladder rail of the stepladder, transferring and maintaining a pulling force between the bar-grate decking and the ladder rail, stabilizing the stepladder for use.

2. The bar-grate-decking ladder stabilizer system of claim 1, further comprising a safety cable adapted to connect said brace unit and said clamp unit.

3. The bar-grate-decking ladder stabilizer system of claim 1, where said clamp unit further comprises a pawl release adapted to release said pawl from said rack teeth of said rack bar.

4. The bar-grate-decking ladder stabilizer system of claim 1, where said clamp unit further comprises a pawl-side arm and a free-side arm adapted to clamp to the ladder rail of the stepladder.

5. The bar-grate-decking ladder stabilizer system of claim 1, where said clamp unit further comprises a latch socket and a latch plug adapted to maintain clamping force upon the ladder rail of the stepladder.

6. The bar-grate-decking ladder stabilizer system of claim 1, where said under-grate crossbar is further adapted to make underside contact with at least four main bearing bars of standard bar-grate decking.

7. The bar-grate-decking ladder stabilizer system of claim 1, where said under-grate crossbar has a length of five inches.

8. The bar-grate-decking ladder stabilizer system of claim 1, where said drop-through preventing handle is further adapted to catch on the bars of the bar-grate-decking to prevent a drop through if accidentally dropped.

9. The bar-grate-decking ladder stabilizer system of claim 1, where said drop-through preventing handle is further adapted to indicate the orientation of said under-grate crossbar in use.

10. The bar-grate-decking ladder stabilizer system of claim 1, where said rack teeth on said rack bar further comprise rack teeth on at least two faces of said rack bar, on at least one face parallel to said under-grate crossbar and at least one face perpendicular to said under-grate crossbar.

11. The bar-grate-decking ladder stabilizer system of claim 1, where said rack teeth on said rack bar further comprise rack teeth on four faces of said rack bar.

12. A bar-grate-decking ladder stabilizer system for use with a standard stepladder on bar-grate decking, the bar-grate-decking ladder stabilizer system comprising:
- (i) a brace unit comprising:
  - (a) a rack bar having rack teeth on at least two faces and having an upward and downward orientation in use;
  - (b) an under-grate crossbar at the downward end of said rack bar, adapted to placement through a void in the bar-grate decking and contact against the underside of at least four main bearing bars of the bar-grate decking; and
  - (c) a drop-through preventing handle at the upward end of said rack bar, adapted to catch on to the bars of the bar-grate-decking to prevent a drop through if accidentally dropped; and
- (ii) a clamp unit comprising:
  - (a) a ladder-rail clamp adapted to clamp to the ladder rail of a standard stepladder;
  - (b) a rack bar guide adapted to allow and control movement of said rack bar; and
  - (c) a pawl adapted to move into and out of said rack bar guide in a ratcheting action allowing upward movement of said brace unit in contact with the bar-grate decking against said clamp unit in contact with the ladder rail of the stepladder, transferring and maintaining a pulling force between the bar-grate decking and the ladder rail, stabilizing the stepladder for use.

* * * * *